(12) United States Patent
Walsh

(10) Patent No.: US 12,395,592 B1
(45) Date of Patent: Aug. 19, 2025

(54) HANDSET CALIBRATION AND LOCATION

(71) Applicant: Fuze, Inc., Boston, MA (US)

(72) Inventor: Matthew Walsh, Ottawa (CA)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 17/318,796

(22) Filed: May 12, 2021

(51) Int. Cl.
*H04M 19/04* (2006.01)
*H04M 1/72454* (2021.01)
*H04R 3/00* (2006.01)

(52) U.S. Cl.
CPC ..... *H04M 19/044* (2013.01); *H04M 1/72454* (2021.01); *H04R 3/00* (2013.01)

(58) Field of Classification Search
CPC ...... H04M 19/04; H04M 3/02; H04M 19/044; H04M 1/72454; H04R 3/00
See application file for complete search history.

(56) References Cited

U.S. PATENT DOCUMENTS

| | | | | |
|---|---|---|---|---|
| 8,452,346 | B1* | 5/2013 | Lin | H04M 19/04 379/252 |
| 9,112,994 | B2* | 8/2015 | Yamada | G06F 3/0482 |
| 2010/0016014 | A1* | 1/2010 | White | H04M 1/22 455/556.1 |
| 2010/0285786 | A1* | 11/2010 | Yamada | H04M 1/72469 455/418 |
| 2011/0075835 | A1* | 3/2011 | Hill | G06F 3/016 340/407.1 |
| 2011/0200210 | A1* | 8/2011 | Kemmochi | H04M 19/04 381/107 |
| 2015/0036671 | A1* | 2/2015 | Fukuda | H04W 8/02 370/338 |
| 2015/0195692 | A1* | 7/2015 | Chow | H04W 4/08 455/414.1 |
| 2016/0044151 | A1* | 2/2016 | Shoemaker | H04M 19/02 455/556.1 |
| 2016/0205267 | A1* | 7/2016 | Vaughn | H04M 19/044 455/566 |
| 2019/0357015 | A1* | 11/2019 | Wheeler | G06V 20/64 |
| 2019/0387088 | A1* | 12/2019 | Singh | G06V 40/10 |

FOREIGN PATENT DOCUMENTS

| | | | | |
|---|---|---|---|---|
| CN | 105898078 A | * | 8/2016 | ........ H04M 1/72569 |
| EP | 2173083 A1 | * | 4/2010 | .......... G06F 3/0482 |
| EP | 2202950 A1 | * | 6/2010 | ............. H04M 1/08 |
| EP | 3133799 A1 | * | 2/2017 | ......... G10L 21/0232 |
| WO | WO-2013170522 A1 | * | 11/2013 | ........ H04M 1/72572 |

* cited by examiner

*Primary Examiner* — Akelaw Teshale
(74) *Attorney, Agent, or Firm* — Vista IP Law Group, LLP

(57) ABSTRACT

A method that includes selecting a first handset from multiple handsets in a locality and instructing the first handset to generate a first ringtone is provided. The method also includes receiving a volume value of the first ringtone measured with a microphone, adjusting, in the first handset, a volume level for the first ringtone based on a desired volume level, and providing a notification to the first handset that the volume level of the first handset has been calibrated. A system and a non-transitory, computer-readable medium storing instructions to perform the above method are also included.

20 Claims, 8 Drawing Sheets

HANDSET CALIBRATION AND LOCATION

BACKGROUND

Field

The present disclosure generally relates to call centers where multiple handsets are placed within a closed locality. More specifically, the present disclosure relates to calibrating and locating one or more handsets within a closed locality.

Description of the Related Art

In today's call centers, there is the constant background noise of phones ringing indiscriminately and sometimes even simultaneously. In many instances, the ringing of one or more phones is particularly loud, creating confusion and discomfort amongst other users in the call center. Moreover, in many instances a technician walks through a room looking for a handset from multiple units to fix, remove, or place it in a proper location, which becomes difficult and time consuming when multiple handsets are lumped close to one another, including the one that is being searched for.

SUMMARY

In one embodiment of the present disclosure, a computer-implemented method is described that includes selecting a first handset from multiple handsets in a locality and instructing the first handset to generate a first ringtone. The computer-implemented method also includes receiving a volume value of the first ringtone measured with a microphone, adjusting, in the first handset, a volume level for the first ringtone based on a desired volume level, and providing a notification to the first handset that the volume level of the first handset has been calibrated.

According to one embodiment, a system is described that includes one or more processors and a memory coupled to the one or more processors, the memory including instructions that, when executed by the one or more processors, cause the one or more processors to select a first handset from multiple handsets in a locality. The one or more processors also execute instructions to instruct the first handset to generate a first ringtone, to receive a volume value of the first ringtone measured with a microphone, to adjust, in the first handset, a volume level for the first ringtone based on a desired volume level, and to provide a notification to the first handset that the volume level of the handset has been calibrated.

In one embodiment of the present disclosure, a computer-implemented method is described that includes activating a microphone in a first handset within a locality comprising multiple handsets. The computer-implemented method also includes causing a client device to generate a first sound signal within the locality, receiving, from the first handset, an indication that the first sound signal is detected by the microphone, and a volume level measured for the first sound signal in the microphone, determining a distance between the client device and the first handset based on the volume level, and locating the first handset based on the distance between the client device and the first handset and on a position of the client device.

According to one embodiment, a non-transitory, machine-readable medium is described that includes instructions, which when executed by one or more processors, cause a computer to perform a method including selecting a first handset from multiple handsets in a locality and instructing the first handset to generate a first ringtone. The method also includes receiving a volume value of the first ringtone measured with a microphone, adjusting, in the first handset, a volume level for the first ringtone based on a desired volume level, and providing a notification to the first handset that the volume level of the first handset has been calibrated.

In yet another embodiment, a system is described that includes a means for storing commands and a means for executing the commands causing the system to perform a method including selecting a first handset from multiple handsets in a locality and instructing the first handset to generate a first ringtone. The method also includes receiving a volume value of the first ringtone measured with a microphone, adjusting, in the first handset, a volume level for the first ringtone based on a desired volume level, and providing a notification to the first handset that the volume level of the first handset has been calibrated.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
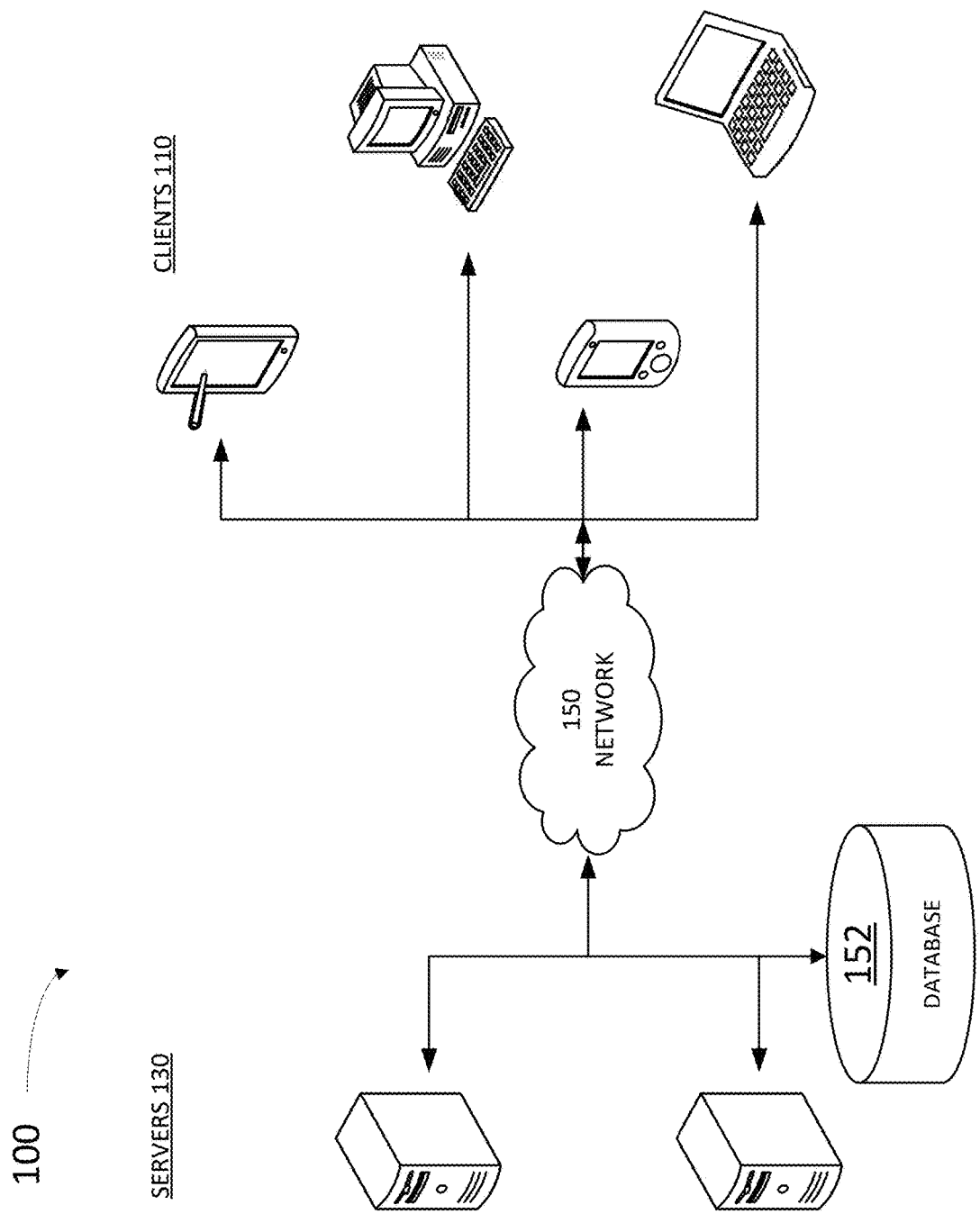
FIG. 1 illustrates an example architecture suitable to provide a platform for handset location and calibration, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In a typical call center, phones ring indiscriminately and sometimes even simultaneously within audible distance of any of the users working therein. In many instances, the ringing of one or more phones is particularly loud, creating confusion and discomfort among other users in the call center. Moreover, in many instances a technician walks through a room in the call center looking for a selected handset from multiple units to fix, service, remove, replace, or place in a proper location, which becomes difficult and time consuming when multiple handsets are lumped close to one another, including the one that is being searched for.

Embodiments as disclosed herein provide a solution to the above problem by a combination of hardware and voice-over internet protocol (VOIP) software. Accordingly, some embodiments provide an automated, centralized handset calibration and location system for a collection of handsets that are within audible range of each other. More specifically, embodiments as disclosed herein use the microphone on the handsets as an input to achieve calibration over multiple handsets in a call center. By having access to all the handsets within a locality, the system is able to turn all but a selected one of the handsets into a collective microphone. Then, the system adjusts the volume of the selected handset until it is within a desired volume range. The selected handset is reconfigured until the volume setting was appropriate for each of the remaining handsets, or at least a threshold number of handsets. Further, some embodiments repeat this procedure for one or more, or the entire group of handsets, one at a time, until all, or a desired number of them, are adjusted.

The disclosed system addresses the problem specifically arising in the realm of computer network and call center technology by providing a solution also rooted in computer technology, namely, by combining technology to adjust volume and remotely controlling the volume of a handset, with the ability to detect the volume of a sound signal. In addition, embodiments as disclosed herein combine the ability to turn 'on' any desired number of microphones in a given locality or call center to reconfigure the handset settings individually.

Some embodiments include an application programming interface (API) for end users (e.g., call center technicians and administrators) to interact with. Some embodiments include a voice API used to reboot the handsets, initiate calls, and fetch event streams that would provide volume level information about calls to and from different handsets. Some embodiments include calibration APIs directed to adjusting and updating other settings in a handset. For example, some handsets have other noise suppression techniques that could be added as options to the system's user (e.g., a "sound fence"), and a centralized server may have access to modifying and adjusting these settings according to embodiments disclosed herein.

While some embodiments include turning 'on' all handsets within a locality, some embodiments may turn them 'on' one at a time, to determine when a particular ringtone from a given handset is louder than others.

In some embodiments, a centralized access to all the handsets in a call center may be used to find and locate precisely a selected handset within the call center. For instance, some embodiments turn 'on' the microphone and play a specific tone from a centralized server or a master mobile device. As the user walks around the call center, the selected handset transmits a signal to the master mobile device or centralized server which, after processing, indicates a relative distance between the master mobile device and the selected handset. Accordingly, some embodiments host an application installed in the master mobile device (e.g., used by a field technician) that would play a custom tone (preferably one that does not disturb people when used during business hours). The application is also configured to receive, from the server, an indication of the distance and location of the selected handset when the server receives a volume value and other sound data from the handset, associated to the sound signal produced by the master mobile device.

Additionally, some embodiments may provide a call center mapping options for the multiple handsets therein by associating approximate distances to the volume of the tone that each handset measures when each other handset rings a tone or generates a sound signal. Some embodiments include an option to make a handset ring in a distinct tone when the microphone is obstructed or blocked for direct acoustic propagation from the source.

Example System Architecture

FIG. 1 illustrates an example architecture 100 suitable to provide a platform for handset location and calibration, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a device provisioning engine that a user may access through client device 110. The user may be a technician servicing multiple handsets within a locality (e.g., a call center office, and the like). In some embodiments, the user may include one or more of the personnel working in the call center, and handling the handsets. Moreover, in some embodiments, the handsets themselves may be client devices 110 communicatively coupled with each other and servers 130 via network 150, and having processor circuits and memory circuits to partially perform operations as disclosed herein. The device provisioning engine may allow the user to remotely access, modify, update, refresh, or remove some of the features and settings in the handsets. Further, in some embodiments, the processor in server 130 is configured to provide support for client devices 110 via network applications such as text messaging services and the like. Information related to, and instructions to handle the device provisioning engine may be stored in a database 152, accessible through network 150. For purposes of load balancing, multiple servers 130 can host memories including instructions to one or more processors and multiple servers 130 for hosting one or more presence detections as disclosed herein.

Servers 130 may include any device having an appropriate processor, memory, and communications capability for hosting the documents and applications associated with the device provisioning engine. The device provisioning engine may be accessible by multiple participants through various client devices 110 over the network 150. Client devices 110 can be, for example, handsets, desktop computers (coupled with handsets, or standalone), mobile computers, tablet computers (e.g., including e-book readers), mobile devices (e.g., a smartphone or PDA), or any other devices having appropriate processor, memory, and communications capabilities for accessing the device provisioning engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
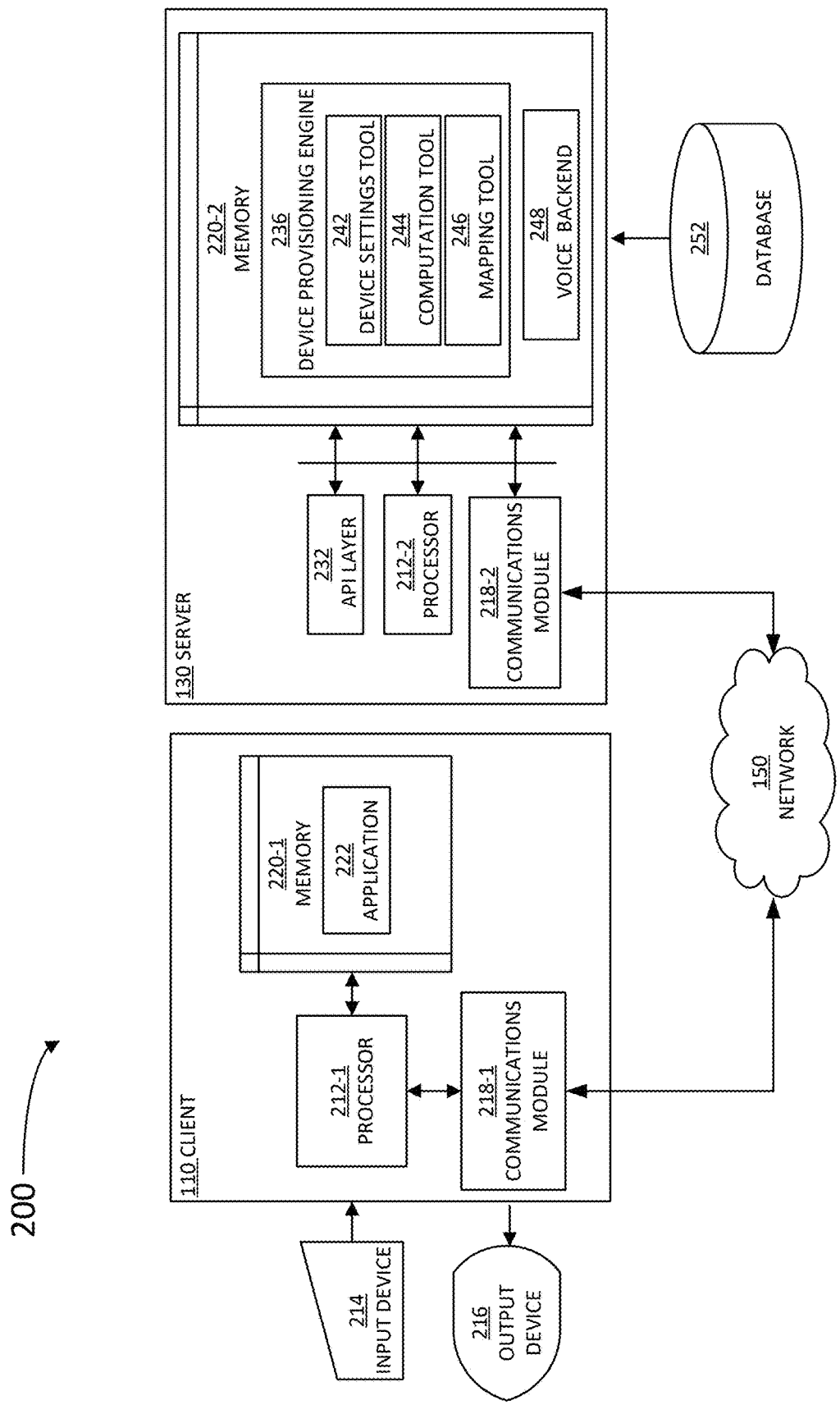
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards.

Client device 110 may be any one of a desktop computer, a laptop, or a mobile computing device. Client device 110 may include a processor 212-1 and a memory 220-1. Processor 212-1 is configured to execute instructions, such as instructions physically coded into processor 212-1, instructions received from software in memory 220-1, or a combination of both. An input device 214 and an output device 216 enable the user to interact with client device 110. Examples of input device 214 and output device 216 may include a mouse, a keyboard, a display, a touch-interactive display, and the like. A user of client device 110 may use input device 214 to submit a document or a media file to device provisioning engine 236 via a user interface of application 222. Application 222 may include displays and screenshots that enable the user of client device 110 to have access to and modify the settings of a handset in a call center, as disclosed herein.

Server 130 includes a memory 220-2, a processor 212-2, and communications module 218-2, and API layer 232. Memory 220-2 includes a device provisioning engine 236. Device provisioning engine 236 includes instructions which, when executed by processor 212-2, cause server 130 to perform at least partially steps as disclosed herein. In some embodiments, device provisioning engine 236 includes instructions to communicate with application 222 to adjust, modify, update, replace, or remove a feature in the settings of client device 110 (e.g., a handset). API layer 232 handles the communications between server 130 and application 222 in client device 110. Device provisioning engine 236 may also include a device settings tool 242, a computation tool 244, and a mapping tool 246. Furthermore, in some embodiments, device provisioning engine 236 may include instructions to retrieve and provide to one or more users at least some of the data in database 252 associated with a given client device or handset. For example, device provisioning engine 236 may provide the status and location of a handset within an enclosed locality. Hereinafter, processors 212-1 and 212-2 will be collectively referred to as "processors 220," and memories 220-1 and 220-2 will be collectively referred to as "memories 220."

In some embodiments, application 222 is configured to run in the background, or on display at output device 216. A user may desire to find out the presence and/or status of a handset, to install new software, or adjust a setting such as a volume level, and apply noise or interference reduction algorithms. Application 222, running in one of client devices 110 (e.g., handsets) may provide to device provisioning engine 236 information related to the receipt and detection of an audio signal through a microphone (e.g., input device 214). Moreover, application 222 may provide to device provisioning engine 236 a volume level of the audio signal. In some embodiments, application 222 may provide instructions to client device 110 to activate output device 216 (e.g., a speakerphone) at a given volume level, to generate the audio signal for testing and calibration.

The user may access device provisioning engine 236 through application 222 installed in memory 220-1 of client device 110. For example, a user may be a technician using application 222 installed in client device 110 (e.g., a mobile phone, notepad, and the like) to access the settings in multiple handsets for a call center. For example, the technician may want to locate a given handset, and then use output device 216 in client device 110 to generate an audio signal. The technician may then use application 222 to have the given handset listen to the audio signal (via communicating through device provisioning engine 236 in server 130). The handset may also provide, to device provisioning engine 236, and indication of a volume level of the received audio signal. Device provisioning engine 236 may then use device settings tool 242, computation tool 244, and mapping tool 246 to identify a location of the handset within the locality. In some embodiments, mapping tool 246 is configured to map the handsets within the locality based on a volume level of the first ringtone received from each of the handsets. Accordingly, server 130 may provide the location to the technician via application 222, so that the technician may quickly locate the given handset. The user may also access device provisioning engine 236 via a web browser installed in client device 110. Execution of application 222 may be controlled by processor 212-1 in client device 110. In some embodiments, application 222 is downloaded and installed by the user into client device 110, from server 130. Memory 220-2 may also include a voice backend 248 to interface with input device 214 (e.g., a microphone) and output device 216 (e.g., a speaker) using voice data.

Figure 3:
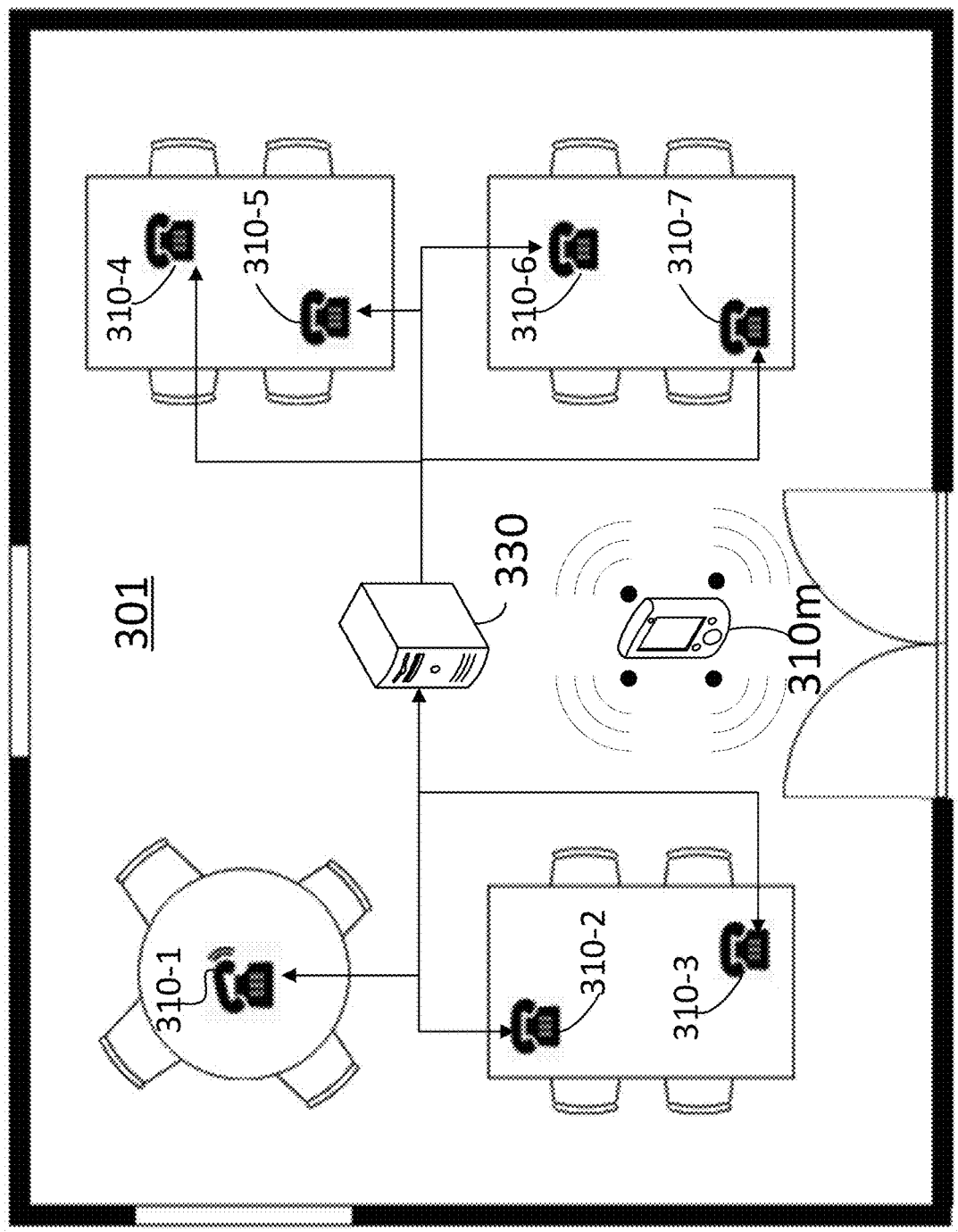
FIG. 3 illustrates a closed locality including multiple handsets for location and calibration, according to some embodiments.

FIG. 3 illustrates a closed locality 301 including multiple handsets 310-1, 310-2, 310-3, 310-4, 310-5, 310-6, and 310-7 (hereinafter, collectively referred to as "handsets 310") for location and calibration, according to some embodiments. A server 330 may be communicatively coupled with handsets 310 via a wired or wireless connection. Server 330 may access configuration settings in one or more, or all, of handsets 310. In some embodiments, server 330 may be communicatively coupled with a master device 310$m$, which is used by a technician or administrator servicing handsets 310. In some embodiments, master device 310$m$ may be a mobile device or computer, a tablet computer, or a desktop computer.

According to some embodiments, a calibration scheme executed by server 330 or by master device 310$m$ may include having a first handset 310-1 (hereinafter, the "selected handset 310") ring or generate a sound signal, while the other handsets 310-2 through 310-7 (hereinafter, collectively referred to as "listening handsets 310") have the microphones turned 'on' to detect the ringing or the sound signal from first handset 310-1. Master device 310$m$ or server 330 then receives, from each of listening handsets 310, a volume level indication of the perceived ring or sound signal from selected handset 310. Based on the perceived volume signals received, server 330 or master device 310m determines whether to reset or adjust the volume settings in selected handset 310. When all listening handsets 310 report a volume level within desirable range (e.g., lower than a maximum volume level), the calibration procedure for selected handset 310 is completed. When at least one of listening devices 310 reports a volume level outside of a desirable range, server 330 or master device 310m may access the settings of the selected handset and adjust the volume level (e.g., reduce it by a pre-selected amount). In some embodiments, the process is repeated until all, or a selected threshold number of listening handsets 310 reports a volume within the desirable range.

Figure 4:
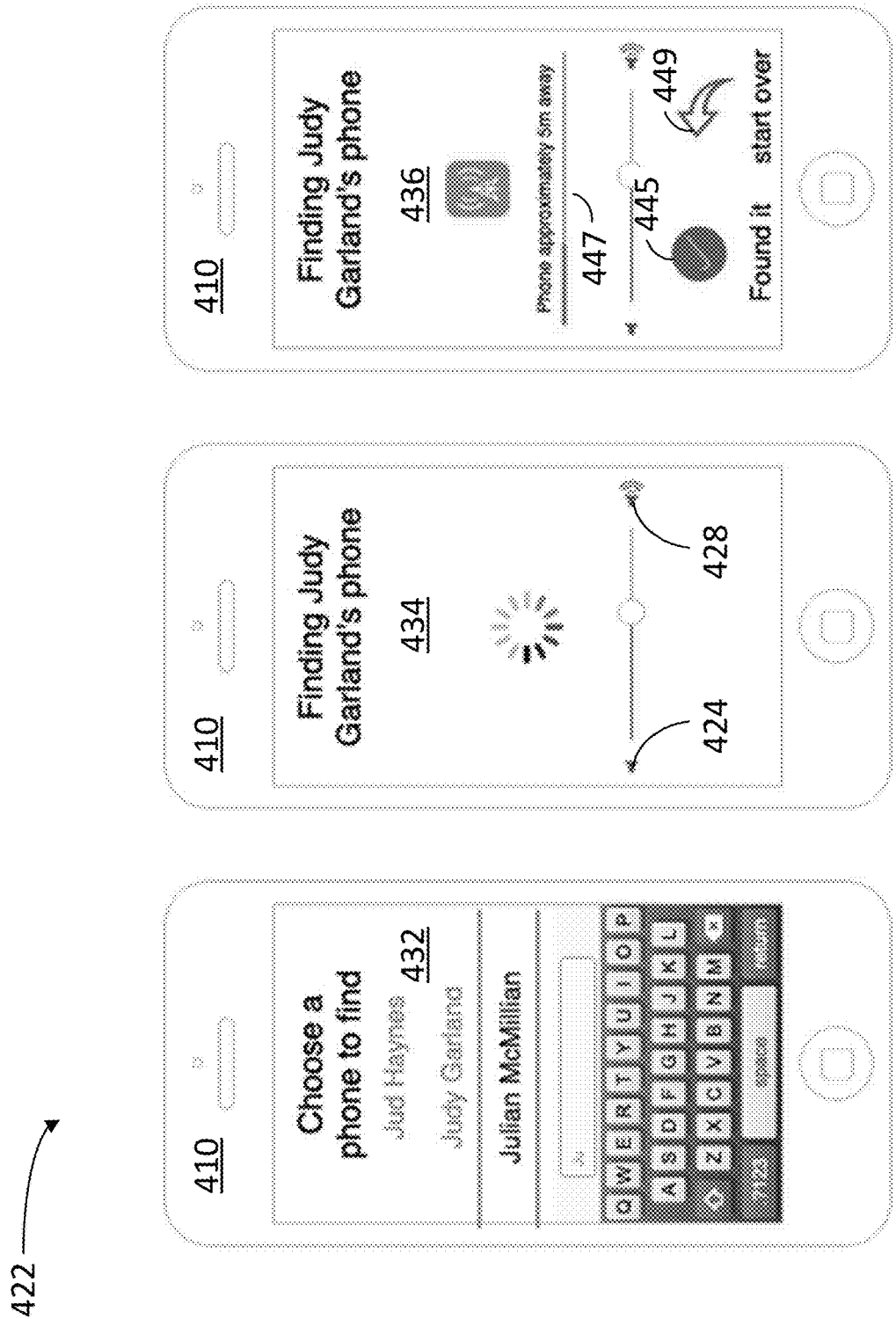
FIG. 4 illustrates a display in a mobile application for finding one or more handsets within a locality, according to some embodiments.

FIG. 4 illustrates a display in a mobile application 422 (cf. application 222) running in a mobile device 410 for finding one or more handsets within a locality, according to some embodiments. Mobile device 410 may be a master device used by a technician servicing multiple handsets in a call center or other locality (cf. master device 310m and locality 301).

In screenshot 432, the user selects a specific handset to find or locate. In screenshot 434, application 422 displays a message indicating that the search process has started. Icon 424 indicates that the speaker in mobile device 410 is ringing or generating a sound signal, and icon 428 indicates that the microphone in the selected handset is active, listening. In some embodiments, an audible sound or ringing may be produced by mobile device 410. In some embodiments, the ringing or sound signal may be encoded so that the selected handset identifies it as a search signal for that particular handset. In some embodiments, the sound signal may be an ultrasound signal that is inaudible to other users and people within the locality (in case the procedure takes place during regular business hours, and the like). In some embodiments, application 422 may have an option for the user to select an audible ringtone or an inaudible sound signal. In screenshot 436, mobile device 410 has located the selected handset and displays an icon 445 illustrating a successful action. In some embodiments, screenshot 436 may further include an indication 447 of a relative distance between the selected handset and mobile device 410. Screenshot 436 may also include an icon 449 prompting the user to start the search over, in case a new search is desired, or the previous search was unsuccessful. In some embodiments, screenshot 436 may include a map of the locality indicating a route (e.g., the shortest route) between mobile device 410 and the selected handset.

Figure 5:
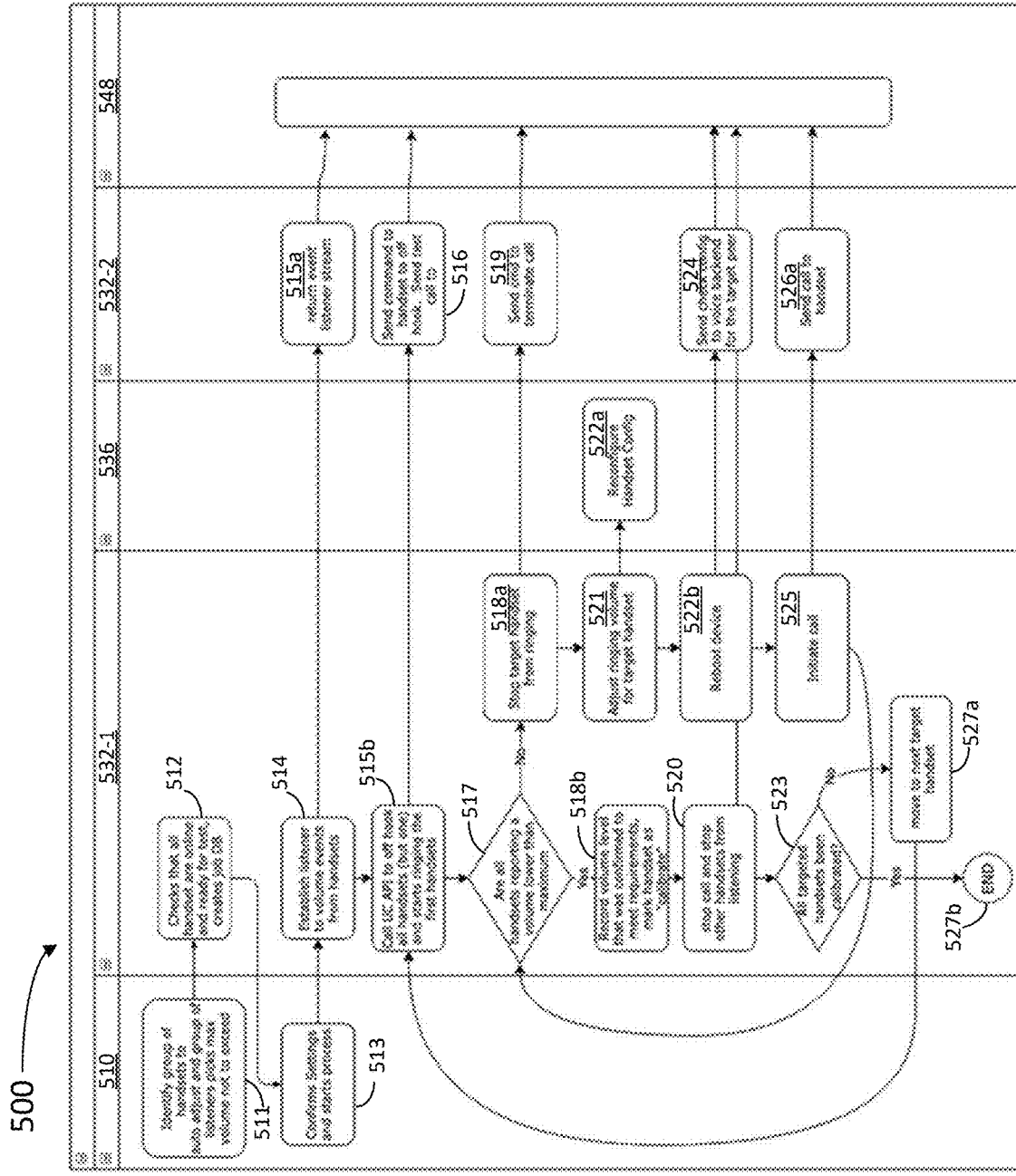
FIG. 5 illustrates a block diagram and a sequence of actions in a system for handset location and calibration, according to some embodiments.

FIG. 5 illustrates a block diagram 500 and a sequence of actions in a system for handset location and calibration, according to some embodiments. A user has a client device 510 communicatively coupled with a server having a first API 532-1, a devise provisioning engine 536, a second API 532-2, and a voice backend 548 (cf. API layer 232, device provisioning engine 236, and voice backend 248).

In step 511, the user identifies a group of handsets to auto adjust, and a group of listener devices picks a maximum volume acceptable for the handsets. In step 512, API 532-1 checks that all handsets are online and ready for test, and generates a job database. In step 513, the user confirms the settings for the handsets and starts the calibration.

In step 514, API 532-1 establishes listener to volume events from handsets. In step 515a, API 532-2 returns event listener stream to voice backend 548. In step 515b, API 532-1 calls API 532-2 to off hook all handsets (except one), and to start ringing the excepted handset. In step 516, API 532-2 receives the call from API 532-1 and sends a command to handsets to get off hook (e.g., turn microphone 'on'), and sends a test call to the handsets to verify that they are off hook. Turning 'on' all the handsets isn't really necessary; we could opt to turn them on one at a time. This could also be used to determine if a particular ringtone is louder than others.

In step 517, API 532-1 determines whether all handsets are reporting a ringtone volume lower than the maximum selected volume (e.g., when the desired volume level is a "maximum" volume level). When at least one handset reports a ringtone volume higher than the maximum selected volume, API 532-1 stops the target handset from ringing in step 518a, and API 532-2 sends a command to terminate the call to voice backend 548 in step 519. In step 521, API 532-1 adjusts the ringing volume in the target handset (e.g., lowering the volume by a pre-selected amount), and device provisioning engine 536 reconfigures the handset configuration settings of the selected handset in step 522a. API 532-1 then reboots the selected handset in step 522b and initiates a new call from the selected handset in step 525, repeating steps 517 through 522b until the answer in step 517 is "yes." In step 524, API 532-2 sends a check configuration command to voice backend 548 for the target peer (e.g., the selected handset). In step 526a, API 532-2 instructs voice backend 548 to send a command to the selected handset to start ringing, or generating a sound signal.

When all handsets report a ringtone volume lower than the selected maximum volume, API 532-1 records the volume level in the selected handset that is confirmed to meet the desired volume level, and marks the selected handset as "calibrated" in step 518b. In step 520, API 532-1 stops the call and stops other handsets from listening (e.g., turning the microphones 'off'). In step 523, API 532-1 determines whether all targeted handsets have been calibrated. When at least one handset is not yet calibrated, API 532-1 moves to a next selected handset for calibration in step 527a, repeating steps 515b onwards, until the answer in step 523 is "yes," and then the calibration process terminates (step 527b).

Figure 6:
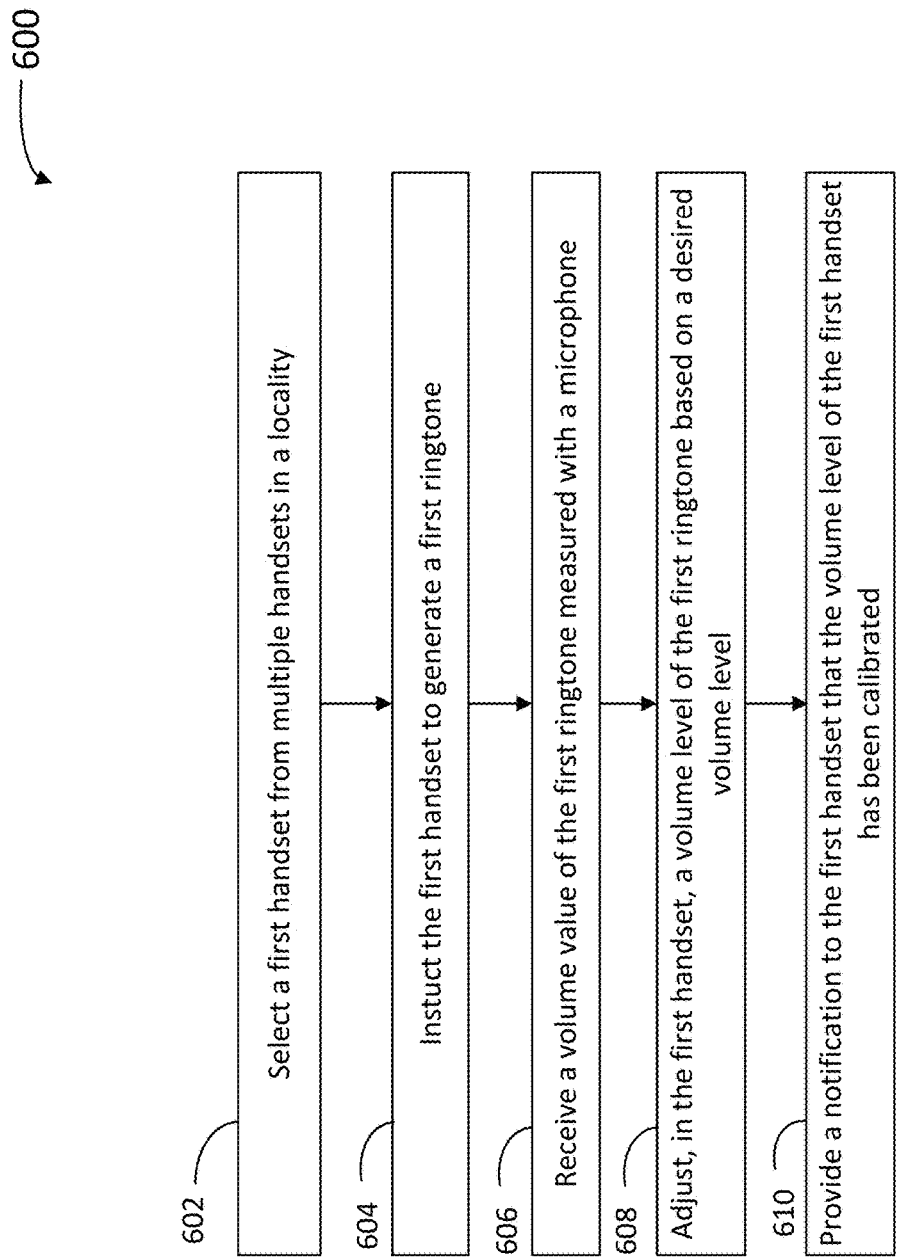
FIG. 6 is a flowchart illustrating steps in a method for calibrating one or more handsets within a locality, according to some embodiments.

FIG. 6 is a flowchart illustrating steps in a method 600 calibrating one or more handsets within a locality, according to some embodiments. Method 600 may be performed at least partially by any one of the network servers hosting a device provisioning engine (e.g., device provisioning engine 236), while communicating with any one of a plurality of client devices (e.g., servers 130 and clients 110). To perform at least some of the steps in method 600, the device provisioning engine may access a device settings tool, a computation tool, and a mapping tool, as disclosed herein (e.g., device settings tool 242, computation tool 244, and mapping tool 246). At least some of the steps in method 600 may be performed by a computer having a processor executing commands stored in a memory of the computer (e.g., processors 212 and memories 220). For example, at least some of the commands may be included in an application installed in a client device accessible by a user, and hosted via an API layer in the network server (e.g., application 222, API layer 232). Further, steps as disclosed in method 600 may include retrieving, editing, and/or storing files in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes selecting a first handset from multiple handsets in a locality.

Step 604 includes instructing the first handset to generate a first ringtone.

Step 606 includes receiving a volume value of the first ringtone measured with a microphone. In some embodiments, the microphone is a microphone of a second handset in the locality, and step 606 includes adjusting the volume level based on a measurement of the volume value of the first ringtone in each handset in the locality. In some embodiments, the microphone is in a client device, and step 606 further includes identifying a relative location between the client device and the first handset. In some embodiments, the microphone is a microphone of a second handset in the locality, and step 606 includes detecting an undesirable sound source from the microphone and providing a filter to the second handset to remove the undesirable sound source. In some embodiments, the microphone is in a second handset, and step 606 includes identifying that the second handset is not within the locality based on the volume value of the first ringtone. In some embodiments, step 606 includes receiving a volume value of the first ringtone and comprises receiving a sound quality measurement from the first ringtone and adjusting a setting in the first handset to improve the sound quality measurement.

Step 608 includes adjusting, in the first handset, a volume level for the first ringtone based on a desired volume level. In some embodiments, step 608 includes identifying a location of the first handset within the locality based on the volume value of the first ringtone. In some embodiments, step 608 includes mapping the handsets within the locality based on a volume level of the first ringtone received from each of the handsets. In some embodiments, step 608 includes instructing a second handset to generate a second ringtone overlapping with the first ringtone. In some embodiments, step 608 includes identifying with the microphone, an interference between the first ringtone and a second ringtone from a second handset, and adjusting a setting in the first handset or the second handset to eliminate the interference.

Step 610 includes providing a notification to the first handset that the volume level of the first handset has been calibrated.

Figure 7:
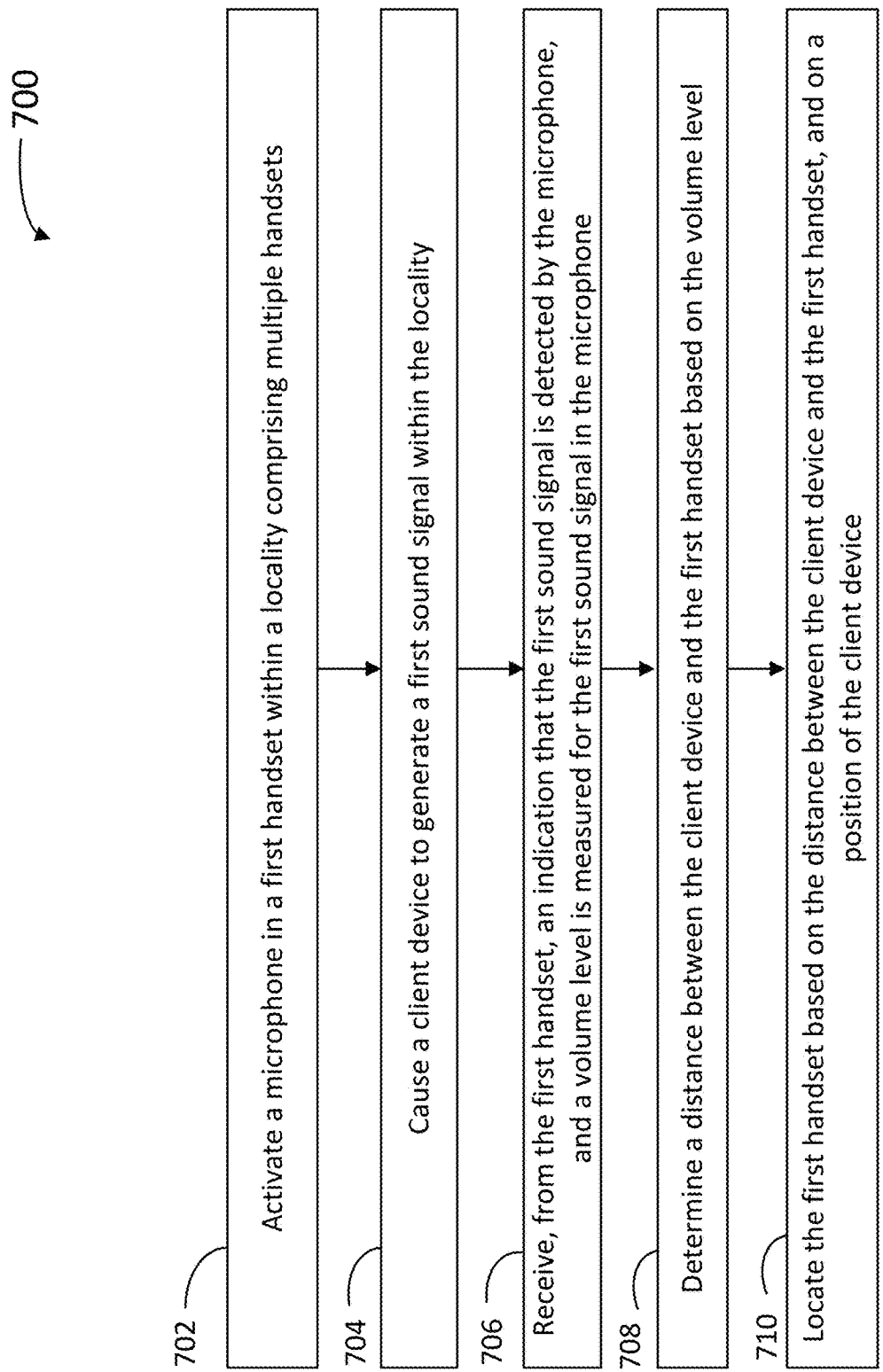
FIG. 7 is a flowchart illustrating steps in a method for finding one or more handsets within a locality, according to some embodiments.

FIG. 7 is a flowchart illustrating steps in a method 700 for finding one or more handsets within a locality, according to some embodiments. Method 700 may be performed at least partially by any one of the network servers hosting a device provisioning engine (e.g., device provisioning engine 236), while communicating with any one of a plurality of client devices (e.g., servers 130 and clients 110). To perform at least some of the steps in method 700, the device provisioning engine may access a device settings tool, a computation tool, and a mapping tool, as disclosed herein (e.g., device settings tool 242, computation tool 244, and mapping tool 246). At least some of the steps in method 700 may be performed by a computer having a processor executing commands stored in a memory of the computer (e.g., processors 212 and memories 220). For example, at least some of the commands may be included in an application installed in a client device accessible by a user, and hosted via an API layer in the network server (e.g., application 222, API layer 232). Further, steps as disclosed in method 700 may include retrieving, editing, and/or storing files in a database that is part of, or is communicably coupled to, the computer (e.g., database 252). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes activating a microphone in a first handset within a locality comprising multiple handsets.

Step 704 includes causing a client device to generate a first sound signal within the locality. In some embodiments, step 704 includes causing the client device to generate an audible ringtone. In some embodiments, step 704 includes causing the client device to generate an ultrasound signal inaudible to a human.

Step 706 includes receiving, from the first handset, an indication that the first sound signal is detected by the microphone, and a volume level is measured for the first sound signal in the microphone.

Step 708 includes determining a distance between the client device and the first handset based on the volume level.

Step 710 includes locating the first handset based on the distance between the client device and the first handset, and on a position of the client device. In some embodiments, the first sound signal encodes a first clock signal from the client device when sending the first sound signal, further comprising receiving a second clock signal from the client device when the first handset has received the first sound signal, and determining a distance between the client device and the first handset includes comparing the first clock signal with the second clock signal. In some embodiments, step 710 further includes causing the client device to generate a second sound signal from a different position, and locating the first handset based on the volume level of the first sound signal and the second sound signal.

Hardware Overview

Figure 8:
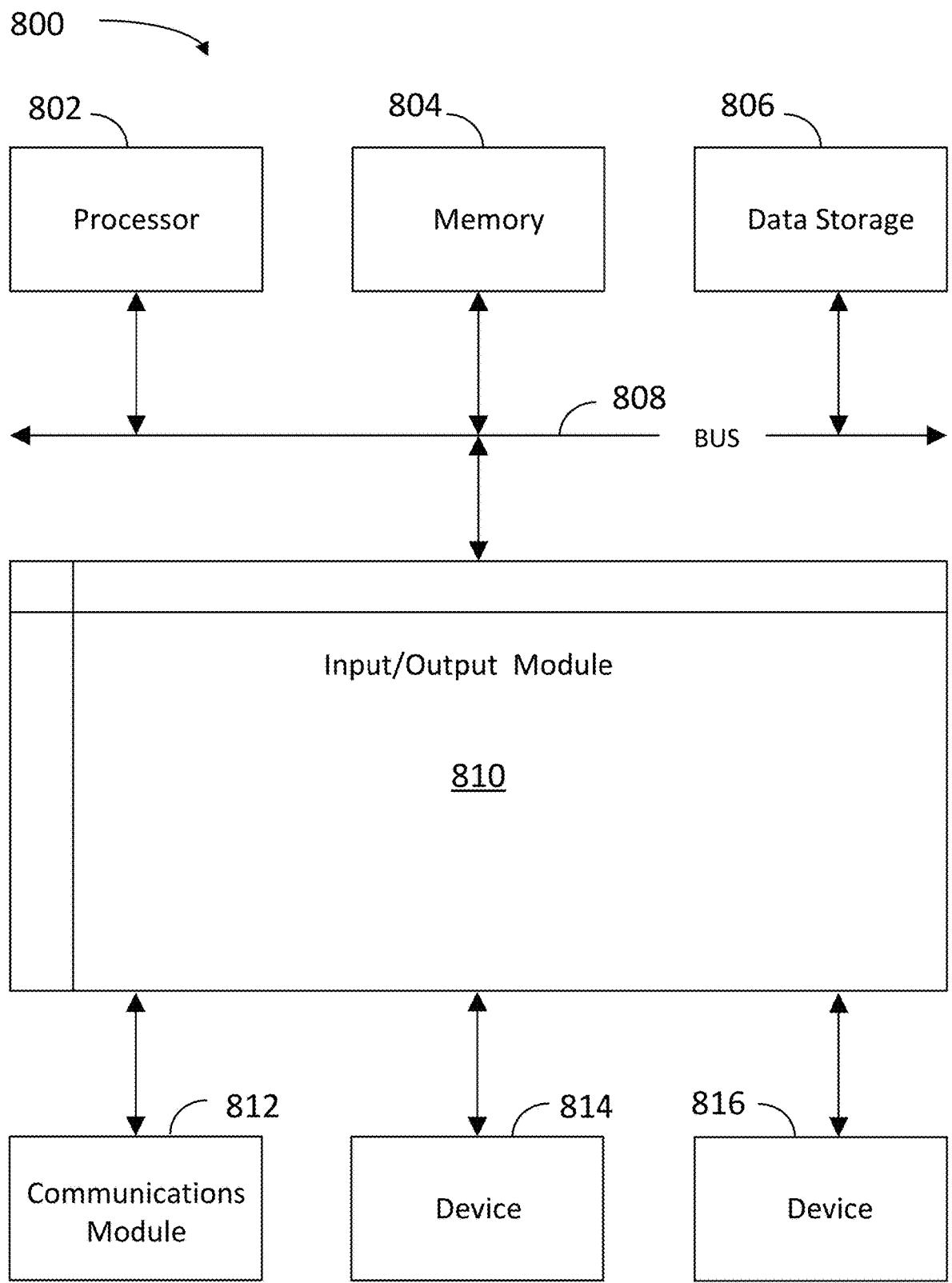
FIG. 8 is a block diagram illustrating an example computer system with which the client and server of FIGS. 1 and 2, and the methods of FIGS. 6 and 7 can be implemented, according to some embodiments.

FIG. 8 is a block diagram illustrating an exemplary computer system 800 with which the client device 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, a special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that include bus 808. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   selecting a first handset, from multiple handsets in a locality;
   instructing the first handset to generate a first ringtone;
   receiving a volume value of the first ringtone measured using a microphone located in the locality at a distance from the first handset;
   adjusting, in the first handset and in response to the volume value of the first ringtone as received via the microphone, a volume level for the first ringtone based on a desired volume level; and
   providing a notification to the first handset that the volume level of the first handset has been calibrated.

2. The computer-implemented method of claim 1, further including causing, from a central location, each of the multiple handsets to off hook except the first handset, wherein while being off hook the first handset is instructed to generate the first ringtone, wherein the microphone is a microphone of a second handset in the locality, and the adjusting the volume level in the first handset includes adjusting the volume level based on a measurement of the volume value of the first ringtone in each handset in the locality.

3. The computer-implemented method of claim 1, wherein the microphone is in a client device, the method further including: identifying a relative location between the client device and the first handset; and repeating said steps of selecting, of instructing, of receiving, and adjusting, for another of the multiple handsets in place of the first handset.

4. The computer-implemented method of claim 1, wherein the microphone is a microphone of a second handset in the locality, further comprising detecting an undesirable sound source from the microphone and providing a filter to the second handset to remove the undesirable sound source.

5. The computer-implemented method of claim 1, wherein the microphone is in a second handset, further comprising identifying that the second handset is not within the locality based on the volume value of the first ringtone.

6. The computer-implemented method of claim 1, wherein receiving a volume value of the first ringtone comprises receiving a sound quality measurement from the first ringtone and adjusting a setting in the first handset to improve the sound quality measurement.

7. The computer-implemented method of claim 1, further comprising identifying a location of the first handset within the locality based on the volume value of the first ringtone.

8. The computer-implemented method of claim 1, further comprising mapping the handsets, based on respective distances to a certain location, within the locality based on a volume level of the first ringtone received from each of the handsets.

9. The computer-implemented method of claim 1, further comprising instructing a second handset to generate a second ringtone overlapping with the first ringtone.

10. The computer-implemented method of claim 1, further comprising identifying with the microphone, an interference between the first ringtone and a second ringtone from a second handset, and adjusting a setting in the first handset or the second handset to eliminate the interference.

11. A system, comprising:
a memory storing instructions; and
one or more processors configured to execute the instructions to cause the system to:
select a first handset from multiple handsets in a locality;
instruct the first handset to generate a first ringtone;
receive a volume value of the first ringtone measured using a microphone;
adjust, in the first handset and in response to the volume value of the first ringtone as received via the microphone, a volume level for the first ringtone based on a desired volume level; and
provide a notification to the first handset that the volume level of the handset has been calibrated.

12. The system of claim 11, wherein the microphone is a microphone of a second handset in the locality, and to adjust the volume level in the first handset the one or more processors execute instructions to adjust the volume level based on a measurement of the volume value of the first ringtone in each handset in the locality.

13. The system of claim 11, wherein the microphone is in a client device, and the one or more processors further execute instructions to identify a relative location between the client device and the first handset.

14. The system of claim 11, wherein the microphone is a microphone of a second handset in the locality, and the one or more processors further execute instructions to detect an undesirable sound source from the microphone and providing a filter to the second handset to remove the undesirable sound source.

15. The system of claim 11, wherein to receive a volume value of the first ringtone the one or more processors execute instructions to receive a sound quality measurement from the first ringtone and adjusting a setting in the first handset to improve the sound quality measurement.

16. A computer-implemented method, comprising:
activating a microphone in a first handset within a locality comprising multiple handsets;
causing a client device, that is enabled to operate independent from the first handset at a distance from the first handset and that includes a speaker, to generate a first sound signal within the locality;
receiving, from the first handset, an indication that the first sound signal is detected by the microphone, and a volume level measured for the first sound signal using the microphone;
determining a distance between the client device and the first handset based on the volume level; and
locating the first handset based on the distance between the client device and the first handset and on a position of the client device.

17. The computer-implemented method of claim 16, wherein causing the client device to generate the first sound signal comprises causing the client device to generate an audible ringtone.

18. The computer-implemented method of claim 16, wherein causing the client device to generate the first sound signal comprises causing the client device to generate an ultrasound signal inaudible to a human.

19. The computer-implemented method of claim 16, wherein the first sound signal encodes a first clock signal from the client device when sending the first sound signal, further comprising receiving a second clock signal from the client device when the first handset has received the first sound signal, and determining a distance between the client device and the first handset includes comparing the first clock signal with the second clock signal.

20. The computer-implemented method of claim 16, further comprising causing the client device to generate a second sound signal from a different position, and locating the first handset based on the volume level of the first sound signal and the second sound signal.

* * * * *